Patented July 7, 1953

2,644,763

UNITED STATES PATENT OFFICE 2,644,763

MODIFIED LOCUST BEAN GUM, SOLUTION THEREOF, AND PROCESS FOR MAKING A LOCUST BEAN GUM SOLUTION

Nat Frisch, White Plains, and Frank J. Sweeney, Forest Hills, N. Y., assignors to Stein, Hall & Company, Inc., New York, N. Y., a corporation of New York No Drawing. Application June 26, 1951, Serial No. 233,693

10 Claims. (Cl. 106—208)

The present invention relates to locust bean gum, modified to render it readily dispersible in water, to a method of dispersing and gelatinizing locust bean gum in water, and to an aqueous solution thereof.

This application is a continuation-in-part of application Serial No. 65,718, filed December 16, 1948.

It has been known for some time that locust bean gum powder or flour, which is obtained from the fleshy seeds in the fruit of the locust or carob tree (Ceratonia siliqua), a perennial legume native to the Mediterranean region, has desirable adhesive and deflocculating properties which make it useful in the preparation of felted sheet material such as paper. It has also been known, however, that it is extremely difficult to disperse locust bean gum uniformly in water so that its ability to defloculate fibers suspended in an aqueous medium can be used to advantage in the manufacture of paper and other felted sheet material.

Thus, for example, a slow addition of one part by weight of straight locust bean gum powder to 100 parts by weight of water while stirring, and the subsequent heating thereof to a temperature of 190–200° F. will result in an incomplete dispersion and solution of the locust bean gum, as evidenced by the presence of lumps that must be strained out before use. Furthermore, the containers and other equipment used in the preparation of an aqueous locust bean gum solution must frequently be cleaned to remove a thick and gummy scum formed on all parts that come in contact with the gum. The great amount of patience required to obtain a dispersion of the gum and the extra time and equipment made necessary thereby are apparently responsible for the limited use that has heretofore been made of locust bean gum in spite of its otherwise promising characteristics.

It has now been found that locust bean gum can be readily dispersed in water in the presence of a sodium borate such as, for example, sodium tetra borate (borax) and sodium meta borate, and an aldehyde selected from the group consisting of glyoxal and pyruvic aldehyde or an acid-reacting compound selected from the group consisting of ammonium chloride, citric acid, boric acid and aluminum sulfate. Optimum results are obtained when the borate and the aldehyde or acid-reacting compound are thoroughly admixed, in the dry state, with locust bean gum powder prior to the addition thereof to water.

It is surprising that a mixture of locust bean gum powder, even with relatively small proportions of borate and aldehyde or acid-reacting compound, is dispersible without difficulty in cold water. When the dispersion is cooked, e. g., by raising its temperature to about 200° F., the locust bean gum "opens" or swells to form a clear, viscous solution that is free of lumps and does not require straining before it is used as an additive to an aqueous suspension of fibrous material such as, for example, a stock suspension from which paper is made. It forms no scum, leaves the mixing equipment clean and obviates the necessity of using special equipment such as strainers and injectors in its preparation. The mixture need not be added slowly, as is necessary with straight locust bean gum, but can be dumped directly into cold water without increasing its liability to form lumps.

The proportions of the various components may vary widely, depending on the results desired. Generally no difficulty is experienced in dispersing mixtures containing up to about 90% by weight of locust bean gum powder. As the proportion of locust bean gum powder increases from 90% and approaches 100%, the difficulty of dispersing the mixture in water increases by degrees but mixtures containing as high as 96% locust bean gum powder can, if added gradually and stirred vigorously, be dispersed without forming lumps either before or after cooking.

It is surprising also that, weight for weight, the mixture has, within the limits of measurable error beneficial effects on the final felted sheet material that are superior to those obtained with straight locust bean gum so long as the proportion of locust bean gum in the mixture is not substantially below about 50%. Thus, for example, it has been found that the bursting, tearing and folding strengths of paper produced by addition to the suspended stock at a rate of five pounds of a mixture consisting of 85% locust bean gum, 10% borate and 5% aldehyde or acid-reacting compound in dispersed form per ton of paper stock, based on the dry weight, are superior to those produced by the addition of straight locust bean gum at the same rate.

In view of the foregoing considerations, the proportion of locust bean gum powder should generally range between about 50 and 96%, the lower limit being determined by the efficacy of the mixture when compared with that of straight locust bean gum and the upper limit being determined by the practicability with which it can readily be dispersed in water without forming lumps. The range of proportions that is preferred is from about 65 to 93% and optimum results, from the standpoint of ease of dispersion, uniformity of appearance and efficacy in paper making processes, have been obtained with mixtures containing about 85 to 90% by weight of locust bean gum powder.

The relative proportions of borate and aldehyde or acid-reacting compound may also vary and depend upon the consistency and characteristics desired in the aqueous solution formed when the mixture is added to water and cooked. The borate tends to impart to the cooked solution a heavy body, high film strength and stringiness. The aldehyde or acid-reacting compound reduces the "ropiness" of the cooked solution and imparts a long stringy character thereto. It has been found desirable, generally to adjust the relative proportions of locust bean gum, borate and aldehyde or acid-reacting compound so that the solution or dispersion thereof in water will have a pH between 3 and 10 and preferably at about 8.0 to 8.2. The ratio of borate to aldehyde or acid-reacting compound may vary from about 1:1 to 3:1 and is preferably about 2:1. The proportions by weight in the mixture are desirably from about 2% to about 35%, preferably from about 5% to about 10%, of borate and from about 1% to about 20%, preferably from about 2% to about 6%, aldehyde or acid-reacting compound.

It is to be understood that other materials, compatible with the three essential ingredients, may be added. Thus, for example, starch may be added if it is desired to reduce the proportion of locust bean gum below about 80%. Small amounts of oxidizing agents, such as barium peroxide and sodium perborate, may be added to thin out the solution prepared when the combination is dissolved in water.

The mixture may be formed simply by thoroughly mixing the components together in the dry state. Where glyoxal, which is normally in the liquid state, forms one of the components, it is sprayed on one or more of the other components prior to or during the dry mixing operation.

Without intending to limit in any way the scope of the present invention, a number of typical formulae are listed in the tables below, the numerals therein referring to percentages by weight.

"Dowicide A" is a well-known preservative which is sodium orthophenylphenate.

Table 3

| Formula No. | 22 | 23 | 24 | 25 |
|---|---|---|---|---|
| Locust Bean Gum | 85 | 84 | 85 | 84 |
| Borax | 10 | 11 | 11 | 11 |
| Glyoxal | | 2 | | |
| Ammonium Chloride | 5 | 3 | 4 | |
| Boric Acid | | | | 5 |

The mixture of this invention has excellent storage properties, bagged samples of the powder having undergone no perceptible change in either appearance or dispersibility even after storage for several months. It can readily be dispersed by dumping it into cold water and cooked by heating to an elevated temperature of the order of about 165° F. to 212° F., preferably about 200° F. In practice, it has been found advantageous, e. g., where it is desired to form a solution containing 99% by weight of water, to add the mixture to half the required amount of water at tap or room temperature, stir and heat it to about 200° F. and then add the remainder of the water.

The solution formed by this method is transparent, viscous and stringy at room temperature and is sufficiently free flowing at temperatures of the order of 160° to 185° F. to be pumped without difficulty through 1" pipes.

To further illustrate the utility of the mixture of this invention and of the aqueous solution thereof, and to compare its efficacy in the production of paper, the following examples are included.

EXAMPLE 1

Four batches of locust bean gum, borax and glyoxal, corresponding to Formulae Nos. 1, 2, 3 and 4 of Table 1, were made up on a laboratory scale. A 1% aqueous solution of each batch was formed by dispersing one part by weight of the dry mixture in about 50 parts by weight of water, cooking the resultant dispersion to 200° F. and then adding sufficient additional water to bring the concentration of solids down to 1% by weight. The temperature of these solutions was maintained at about 180° F.

A 1% solution of locust bean gum alone was prepared in a similar manner.

Table 1

| Formula No. | 1 | 2 | 3 | 4 | 5 | 6 | 7 | 8 | 9 | 10 | 11 |
|---|---|---|---|---|---|---|---|---|---|---|---|
| Locust Bean Gum | 85 | 87 | 90 | 90 | 85 | 85 | 80 | 70 | 60 | 50 | 84 |
| Borax | 10 | 7 | 5 | 6 | 10 | 10 | 12 | 20 | 26.6 | 33.3 | 11 |
| Glyoxal | 5 | 6 | 5 | 4 | | | 5 | 5 | 5 | 5 | |
| Pyruvic Aldehyde | | | | | 5 | | | | | | 2 |
| Ammonium Chloride | | | | | | 5 | 3 | 5 | 8.4 | 11.7 | 3 |

Table 2

| Formula No. | 12 | 13 | 14 | 15 | 16 | 17 | 18 | 19 | 20 | 21 |
|---|---|---|---|---|---|---|---|---|---|---|
| Locust Bean Gum | 85 | 84 | 96 | 84 | 68 | 84.9 | 85 | 85 | 84 | 85 |
| Powdered Potato Starch | | | | | 17 | | | | | |
| Borax | 10 | 10 | 2 | 11 | 10 | 10 | 10 | | 11 | 11 |
| Sodium Metaborate | | | | | | | | 10 | | |
| Glyoxal | | 5 | 1 | 2 | 5 | 5 | | 5 | 2 | |
| Citric Acid | | | | | | | 5 | | | |
| Boric Acid | | | | | | | | | 3 | 4 |
| Aluminum Sulfate | 5 | | | 3 | | | | | | |
| Barium Peroxide | | 1 | | | | | | | | |
| Sodium Perborate | | | 1 | | | | | | | |
| "Dowicide A" | | | | | | 0.1 | | | | |

A number of paper making runs, on a laboratory scale, corresponding to the number of solutions prepared, were then made. In each run, one of the prepared solutions was added to the furnish at the rate of 10 lbs., based on the dry weight, of solution to a ton of furnish, likewise based on the dry weight.

Two sheets each having a weight of 2.8 grams were selected from each run to eliminate test errors due to variations in the weight of the sheets produced and each sheet selected was subjected to ten mullen tests. The averages of the twenty mullen tests in each run are tabulated below:

| Formula No. | Average Mullen Count |
|---|---|
| 1 | 33.33 |
| 2 | 32.3 |
| 3 | 32.05 |
| 4 | 32.0 |
| Locust Bean Gum Alone | 30.85 |

EXAMPLE 2

Dry mixtures corresponding to Formulae Nos. 7, 8, 9, 10, 11, 13, 14, 16, 18, 19 and 20 were made up, on a laboratory scale, into 1% aqueous solutions by dispersing one part by weight of each dry mixture in about 50 parts by weight of water, cooking the resulting dispersions to 200° F. and then adding sufficient additional water to bring the concentration of solids down to 1% by weight. The temperature of these solutions was maintained at about 180° F.

A number of paper making runs on a laboratory scale were then made. In each run, a number of blank and modified paper sheets were made. The blank sheets were made without adding a locust bean gum containing solution to the furnish and the modified sheets were made by adding one of the prepared solutions at a rate of 10 lbs., based on the dry weight, of solution to a ton of furnish, likewise based on the dry weight.

Two blank sheets and two modified sheets each having a weight of 2.8 grams were selected from each run to eliminate test errors due to variations in the weight of the sheets produced and each sheet selected was subjected to ten mullen tests. The averages of the twenty mullen tests conducted on each set of two sheets are tabulated below:

| Formula No. | Blank Sheets | Modified Sheets |
|---|---|---|
| 7 | 40.65 | 46.0 |
| 8 | 40.65 | 44.9 |
| 9 | 37.5 | 45.4 |
| 10 | 37.5 | 44.6 |
| 11 | 42.7 | 45.9 |
| 13 | 43.5 | 45.7 |
| 14 | 44.5 | 47.7 |
| 16 | 41.6 | 45.4 |
| 18 | 48.9 | 52.4 |
| 19 | 43.1 | 45.2 |
| 20 | 42.7 | 48.5 |

EXAMPLE 3

Dry mixtures corresponding to Formulae Nos. 12 and 21 were made up, on a laboratory scale into 1% aqueous solutions by dispersing one part by weight of each dry mixture in about 50 parts by weight in water, cooking the resulting dispersions to 200° F. and then adding sufficient additional water to bring the concentration of solids down to ¼ to ½ per cent by weight.

A number of paper making runs on a laboratory scale were then made. In each run, a number of blank and modified paper sheets were made. The blank sheets were made without adding a locust bean gum containing solution to the furnish and the modified sheets were made by adding one of the cooked solutions, at a temperature of approximately 100° F. and at a rate of 10 lbs. based on the dry weight, of solution to a ton of furnish, likewise based on the dry weight.

Two blank sheets and two modified sheets each having a weight of 2.97 plus or minus .03 gram were selected from each run to eliminate test errors due to variations in the weight of the sheets produced and each sheet selected was subjected to ten mullen tests. The averages of the twenty mullen tests conducted on each set of two sheets are tabulated below:

| Formula No. | Blank Sheets | Modified Sheets |
|---|---|---|
| 12 | 44.2 | 48.9 |
| 21 | 46.1 | 51.6 |

EXAMPLE 4

Dry mixtures corresponding to Formulae Nos. 22, 23 and 24 were made up, on a laboratory scale, into 1% aqueous solutions by dispersing one part by weight of each dry mixture in about 50 parts by weight of water, cooking the resulting dispersions to 200° F. and then adding sufficient additional water to bring the concentration of solids down to 1% by weight.

A number of blank and modified paper sheets were made and tested in the manner described in Example 3. In addition, modified sheets were made by adding the prepared solution at a rate of 5 lbs., based on the dry weight, of solution to a ton of furnish, likewise based on dry weight. These modified sheets were likewise subjected to mullen tests.

Two blank sheets and two modified sheets, each having a weight of 3.0 plus or minus .01 gram were selected from each run to eliminate test errors due to variations in the weight of the sheets produced and each sheet selected was subjected to ten mullen tests. The average of the twenty mullen tests conducted on each set of two sheets and the increases in percent mullen obtained with the modified sheets are tabulated immediately below:

| Formula No. | Blank Sheets | Modified Sheets | | | |
|---|---|---|---|---|---|
| | | 10 lbs./ton | | 5 lbs./ton | |
| | | Mullen | Percent Inc. | Mullen | Percent Inc. |
| 22 | 47.2 | 52.65 | 11.6 | 50.7 | 7.4 |
| 23 | 47.2 | 52.55 | 11.4 | 50.9 | 7.8 |
| 24 | 47.2 | 53.05 | 12.4 | | |

It is to be understood that innumerable modifications will readily occur to those skilled in the art upon reading this description. All such modifications are intended to be included within the scope of the present invention as defined in the appended claims.

We claim:
1. A mixture comprising from about 50% to about 96% by weight of locust bean gum, from about 2% to about 35% by weight of a sodium borate and from about 1% to about 20% by weight of an agent for overcoming the inhibit- ing effect of the borate on the swelling of the gum, said agent being a soluble, acid-reacting, inorganic salt selected from the group consisting of ammonium chloride and aluminum sulfate, the relative proportions of borate to salt ranging from about 1:1 to 3:1.

2. A mixture comprising from about 85% to about 90% by weight of locust bean gum, from about 5% to about 10% by weight of a sodium borate and from about 2% to about 6% by weight of an agent for overcoming the inhibiting effect of the borate on the swelling of the gum, said agent being a soluble, acid-reacting, inorganic salt selected from the group consisting of ammonium chloride and aluminum sulfate, the relative proportions of borate to salt being about 2:1.

3. An aqueous solution wherein about 50% to 96% by weight of the solute is locust bean gum, about 2% to 35% by weight of the solute is a sodium borate and about 1% to 20% by weight of the solute is an agent for overcoming the inhibiting effect of the borate on the swelling of the gum, said agent being a soluble, acid-reacting, inorganic salt selected from the group consisting of ammonium chloride and aluminum sulfate.

4. An aqueous solution wherein about 85% to 90% by weight of the solute is locust bean gum, about 5% to 10% by weight of the solute is a sodium borate and about 2% to 6% by weight of the solute is an agent for overcoming the inhibiting effect of the borate on the swelling of the gum, said agent being a soluble, acid-reacting, inorganic salt selected from the group consisting of ammonium chloride and aluminum sulfate.

5. A method of preparing an aqueous solution of locust bean gum in water which comprises adding to water a dry mixture of locust bean gum powder, a sodium borate and an agent for overcoming the inhibiting effect of the borate on the swelling of the gum, said agent being a soluble, acid-reacting, inorganic salt selected from the group consisting of ammonium chloride and aluminum sulfate and heating it to a temperature of about 200° F.

6. A method of preparing an aqueous solution of locut bean gum in water which comprises adding to water a dry mixture containing 50 to 96 parts by weight of locust bean gum powder, 2 to 35 parts by weight of a sodium borate and 1 to 20 parts by weight of an agent for overcoming the inhibiting effect of the borate on the swelling of the gum, said agent being a soluble, acid-reacting, inorganic salt selected from the group consisting of ammonium chloride and aluminum sulfate, and heating it to a temperature of about 200° F.

7. A method of preparing an aqueous solution of locust bean gum in water which comprises adding to water a dry mixture containing 85 to 90 parts by weight of locust bean gum powder, 5 to 10 parts by weight of a sodium borate and 2 to 6 parts by weight of an agent for overcoming the inhibiting effect of the borate on the swelling of the gum, said agent being a soluble, acid-reacting, inorganic salt selected from the group consisting of ammonium chloride and aluminum sulfate, and heating it to a temperature of about 200° F.

8. A method of preparing an aqueous solution of locust bean gum which comprises dispersing dry locust bean gum powder in water in the presence of a sodium borate and an agent for overcoming the inhibiting effect of the borate on the swelling of the gum, said agent being a soluble, acid-reacting, inorganic salt selected from the group consisting of ammonium chloride and aluminum sulfate, and heating the dispersion to a temperature of about 200° F.

9. A method of preparing an aqueous solution of locust bean gum which comprises dispersing 50 to 96 parts by weight of dry locust bean gum powder in water in the presence of 2 to 35 parts by weight of a sodium borate and 1 to 20 parts by weight of an agent for overcoming the inhibiting effect of the borate on the swelling of the gum, said agent being a soluble, acid-reacting, inorganic salt selected from the group consisting of ammonium chloride and aluminum sulfate, and heating the dispersion to a temperature of about 200° F.

10. A method of preparing an aqueous solution of locust bean gum which comprises dispersing 85 to 90 parts by weight of dry locust bean gum powder in water in the presence of 5 to 10 parts by weight of a sodium borate and 2 to 6 parts by weight of an agent for overcoming the inhibiting effect of the borate on the swelling of the gum, said agent being a soluble, acid-reacting, inorganic salt selected from the group consisting of ammonium chloride and aluminum sulfate, and heating the dispersion to a temperature of about 200° F.

NAT FRISCH.
FRANK J. SWEENEY.

References Cited in the file of this patent

UNITED STATES PATENTS

| Number | Name | Date |
| --- | --- | --- |
| 1,106,335 | Pinel | Aug. 4, 1914 |
| 2,144,522 | Braun | Jan. 17, 1939 |

OTHER REFERENCES

Tagliani, "Jour. Soc. Dyers and Colourists" 45, pages 344 to 349 (1929).